(No Model.)

J. S. SEATTER.
COMBINED RAKE AND HOE.

No. 354,355. Patented Dec. 14, 1886.

Witnesses:
A. Ruppert.
E. Cruse

Inventor:
John S. Seatter,
by Cutt W. J. Thomas,
atty.

UNITED STATES PATENT OFFICE.

JOHN S. SEATTER, OF VISALIA, CALIFORNIA.

COMBINED RAKE AND HOE.

SPECIFICATION forming part of Letters Patent No. 354,355, dated December 14, 1886.

Application filed January 5, 1886. Renewed November 5, 1886. Serial No. 218,077. (No model.)

*To all whom it may concern:*

Be it known that I, JOHN S. SEATTER, of Visalia, in the county of Tulare and State of California, have invented an Improved Combined Rake and Hoe, of which the following is a specification, reference being had to the accompanying drawings, and to the letters of reference marked thereon.

Figure 1:
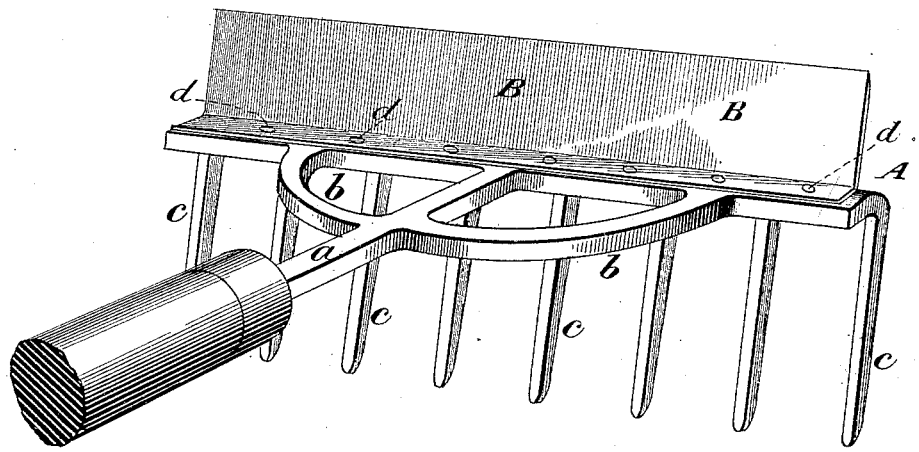
Figure 2:
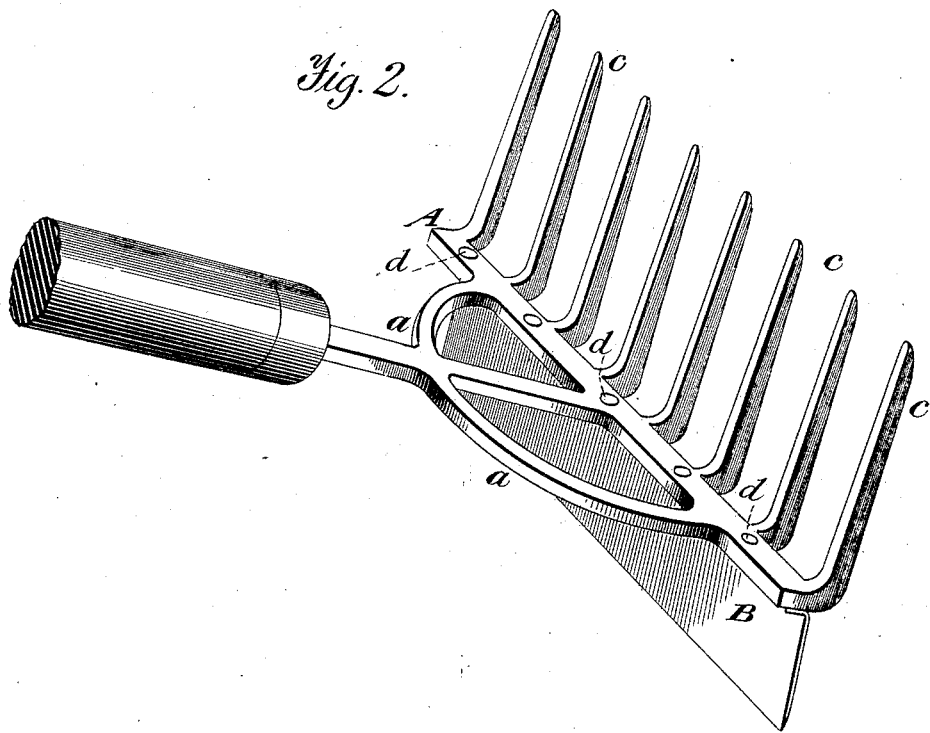

In the drawings, Figure 1 is a perspective view of the implement used as a rake. Fig. 2 is a similar view showing the implement used as a hoe.

The object of this invention is to produce a strong and effective rake and hoe for general agricultural and gardening purposes.

The rake-head is represented by A, and the shank for the handle by $a$. The shank is attached to the rake-head by means of the central and lateral braces, $b$, which are preferably welded to the shank and rake-head. The rake-teeth (represented by $c$) are preferably solid with the rake-head, and are of a considerable length, and spaced widely apart, as shown.

B is the hoe-blade, which is formed of a sheet of steel bent to a right angle at its base, and secured to the flat upper surface of the rake-head A by rivets $d$. The function of the hoe-blade is twofold. First, when the implement is reversed or turned over, as shown in Fig. 2, the blade serves the usual purpose of a hoe, and when so used the weight of the rake-teeth acts advantageously in increasing the effectiveness of the stroke or blow given to the hoe, especially when used as a chopping-hoe.

It will be seen by reference to Fig. 2 that when the implement is reversed the teeth stand a little beyond the line of the front of the blade, and in practice it is found that this arrangement gives greater effectiveness to the stroke or blow of the hoe. The second function of the hoe-blade is to re-enforce or strengthen the rake-head. The placing of the hoe-blade longitudinally of the rake-head, it is apparent, gives great strength to the implement, and the bending of the rake-head is effectually prevented. In short, my invention is found to be a cheap and effective implement.

I do not claim, broadly, a combined rake and hoe, which I am aware is not new; but, Having described my invention, I claim—

The improved rake and hoe herein described, consisting of the rake-head A, having teeth, shank, and braces, combined with the hoe-blade B, having a right-angle bend or flange and riveted longitudinally to the rake-head, substantially as set forth.

In testimony whereof I hereunto set my hand and seal.

JOHN S. SEATTER. [L. S.]

Witnesses:
WM. H. HAMMOND,
G. A. BOTSFORD.